(12) United States Patent
Robichaud (10) Patent No.: US 10,095,397 B2
(45) Date of Patent: Oct. 9, 2018

(54) NAVIGATING SCROLLABLE SECTIONS OF CONTENT IN A VIEWING AREA

(71) Applicant: Splunk Inc., San Francisco, CA (US)

(72) Inventor: Marc Robichaud, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 481 days.

(21) Appl. No.: 13/874,223

(22) Filed: Apr. 30, 2013

(65) Prior Publication Data

US 2013/0239047 A1 Sep. 12, 2013

(51) Int. Cl.
*G06F 3/0485* (2013.01)

(52) U.S. Cl.
CPC .................. *G06F 3/0485* (2013.01)

(58) Field of Classification Search
CPC .................................... G06F 3/0485
USPC ....................................... 715/784
See application file for complete search history.

(56) References Cited

U.S. PATENT DOCUMENTS

| | | | |
|---|---|---|---|
| 8,645,859 B2 * | 2/2014 | Rauenzahn et al. | 715/784 |
| 2005/0114790 A1 * | 5/2005 | Dunbar et al. | 715/785 |
| 2008/0082938 A1 * | 4/2008 | Buczek | 715/784 |
| 2008/0276194 A1 * | 11/2008 | Dykstra-Erickson | G06F 17/243 715/780 |
| 2009/0100373 A1 * | 4/2009 | Pixley | G06F 3/03543 715/786 |
| 2010/0083082 A1 * | 4/2010 | Lehrian et al. | 715/212 |
| 2012/0089914 A1 * | 4/2012 | Holt et al. | 715/728 |
| 2012/0221969 A1 * | 8/2012 | Sansen | G06F 3/0482 715/784 |

* cited by examiner

*Primary Examiner* — Jennifer N To
*Assistant Examiner* — Ashley M Fortino
(74) *Attorney, Agent, or Firm* — Perkins Coie LLP (57) ABSTRACT

Systems and methods for displaying an interface are provided. A system and method can be configured to display a scrollable viewing region. The viewing region can be a fixed size and the viewing region can facilitate displaying underlying content. Underlying content can be divided into multiple sectioned viewing areas, and each sectioned viewing area can have a corresponding heading. Headings can be docked or undocked. Input corresponding to a scroll movement can be received, and the viewing region can be adjusted according to the scroll movement. Adjusting a viewing region can include shifting the display of the underlying content by docking or undocking headings. Headings can be docked or undocked as they occur in the underlying content.

30 Claims, 10 Drawing Sheets

NAVIGATING SCROLLABLE SECTIONS OF CONTENT IN A VIEWING AREA

SUMMARY

In accordance with the teachings provided herein, systems and methods for displaying an interface are provided. For example, a system and method can be configured to display a scrollable viewing region. The viewing region can be a fixed size and the viewing region can facilitate displaying underlying content. Underlying content can be divided into multiple sectioned viewing areas, and each sectioned viewing area can have a corresponding heading. Headings can be docked or undocked.

Input corresponding to a scroll movement can be received, and the viewing region can be adjusted according to the scroll movement. Adjusting a viewing region can include shifting the display of the underlying content by docking or undocking headings. Headings can be docked or undocked as they occur in the underlying content.

In some embodiments, when a heading is docked, the corresponding viewing area is not visible or partially visible. In other embodiments, when a heading is undocked, the corresponding viewing area is visible or partially visible. In still other embodiments, multiple headings can be docked or undocked at any point within a viewing region.

In some embodiments, input corresponding to a selection of a heading can be received, and a heading can be docked or undocked in response to the selection. In these embodiments, the scroll movement and the viewing region can be automatically adjusted according to the selected heading.

In some embodiments, docked headings are stacked. In these embodiments, when docked headings are stacked at the bottom of a viewing region, receiving input corresponding to a selection of a bottom docked heading can cause the scroll movement and the viewing region to be downwardly adjusted a minimum distance needed to display the viewing area associated with the selected heading. Additionally, in these embodiments, when docked headings are stacked at the top of a viewing region, receiving input corresponding to a selection of a top docked heading can cause the scroll movement and the viewing region to be upwardly adjusted a minimum distance needed to display the viewing area associated with the selected heading.

In some embodiments, when a viewing area is partially visible, selection of a corresponding heading can cause the partially visible viewing area to become fully visible, and the viewing region to be adjusted a minimum distance needed to display the viewing area associated with the selected heading.

In some embodiments, headings can be concurrently docked at both the top and the bottom of a viewing region. In other embodiments, docked headings can be associated with a graphic indication. In still other embodiments, a viewing area can include one or more graphical elements.

In some embodiments, adjusting a viewing region according to a scroll movement can include an animated effect. In other embodiments, adjusting a viewing region according to a scroll movement can include using a linear or non-linear mapping measured by distance and time.

Particular embodiments of the subject matter described in this specification can be implemented to realize one or more of the following advantages.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
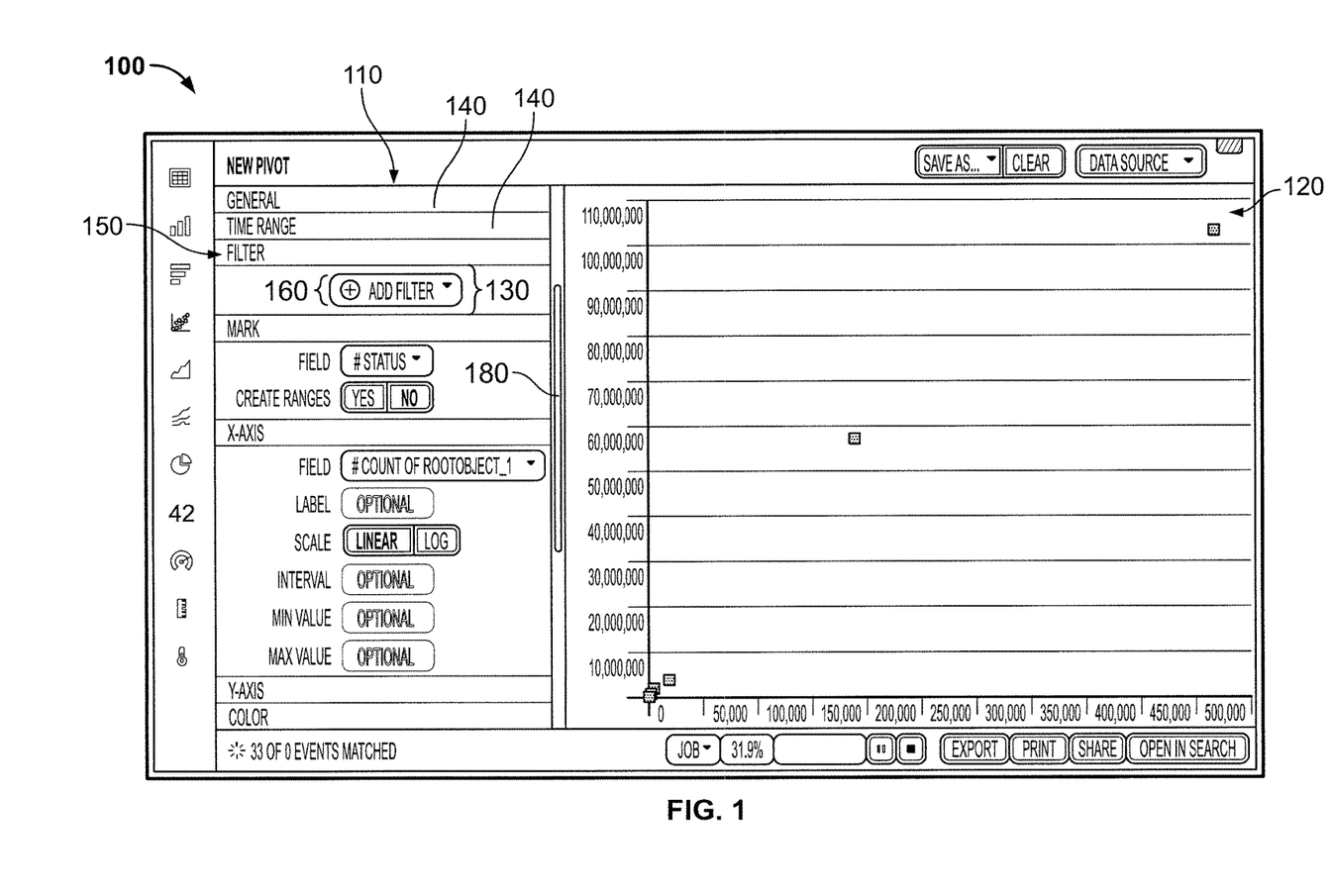
FIG. 1 shows an example display of an embedded viewing region.

FIG. 1 shows an example display 100 of an embedded viewing region (e.g., a viewport). Viewing region 110 can be displayed on any computing device (e.g., laptop, destop, notebook, or mobile device), and can be interacted with using any peripheral device. Additionally, viewing region 110 can include a touch interface for receiving touch input to facilitate the systems and methods described below.

Viewing region 110 can be scrollable. Additionally, viewing region 110 can be a fixed size. Viewing region 110 can facilitate viewing underlying content. For example, underlying content can be displayed when viewing region 110 is scrolled over the underlying content (e.g., when viewing region 110 is smaller than the underlying content being displayed). Underlying content can be divided into multiple sectioned viewing areas, and each sectioned viewing area can have a corresponding heading. Additionally, headings can be docked or undocked. Sectioned viewing areas and corresponding headings will be discussed in greater detail below.

Viewing region 110 can be embedded or otherwise displayed in relation to other grahical elements. For example, in example display 110, viewing region 110 is embedded within a webpage 120. Viewing regions can include multiple sectioned viewing areas 130, and each sectioned viewing area 130 can have a corresponding selectable heading 140. Selectable headings 140 can be docked. Docked headings can be stacked or affixed to the top or bottom of a viewing region such that they no longer scroll with a viewing region. When a selectable heading is docked, the viewing area corresponding to the selectable heading is not visible. Selectable headings 140 can also be undocked (e.g., unstacked). Undocked headings are not stacked or affixed within a viewing region, and thus they can move or scroll within a viewing region. When a selectable heading is undocked, the viewing area corresponding to the selectable heading is visible. In some implementations, docked headings can be associated with a graphic indication (e.g., a color or shading) of state, such as an error. Headings within a viewing region can be any combination of docked and undocked, including all docked or all undocked. In some implementations, one or more headings can be concurrently docked at both the top and the bottom of a viewing region.

Scrolling within a viewing region can cause headings to become docked (if undocked), or undocked (if docked). Additionally, selection of a docked heading can cause a corresponding hidden or partially hidden viewing area to scroll into view. In some implementations, docking and undocking headings can include an animated effect (e.g., an animated growth or reduction of a viewing area). Docking and undocking headings (and the associated animated effects), can occur at different rates depending on time and distance. Differing rates based on time and distance will be discussed in greater detail with respect to FIGS. 8A and 8B below.

Additionally, in some implementations, an expanded viewing area and content within an expanded viewing area (e.g., one or more graphical elements such as drop down boxes, text, selection boxes, etc.), can be visible or partially visible. For example, selection of heading 150 can cause content 160 within viewing area 130 to become visible when content 160 was partially visible. Partially visibly viewing areas will be discussed in greater detail with respect to FIGS. 6 and 7 below.

Viewing region 110 can include scroll bar 180. Interaction with scroll bar 180 can cause a scrolling effect that corresponds to the entire viewing region 110 including any combination of docked headings (and corresponding non-visible viewing areas), undocked headings, (and corresponding visible viewing areas), partially expanded (e.g., partially visible) viewing areas, and content within visible and partially visible viewing areas. Moving scroll bar 180 up or down can cause the viewing region 110 to be scrolled over the underlying content. As the scroll bar 180 is interacted with or moved within viewing region 110, placement of the viewing region 110 with respect to the underlying content can be adjusted accordingly.

For example, adjusting the viewing region 110 can include shifting the display of the underlying content by docking or undocking one or more headings as they occur in the underlying content. As headings dock, corresponding viewing areas can become non-visible. As headings undock, corresponding viewing areas can become visible. In some implementations, multiple headings can be concurrently docked (e.g., at the top of a viewing region), and undocked (e.g., at the bottom of a viewing region), within a single viewing region. In these implementations, scrolling within the viewing region can cause the headings to undock (e.g., the corresponding viewing areas become visible), or dock (e.g., the corresponding viewing areas become not visible), creating an "accordion"-like effect.

In some implementations, viewing areas can grow and contract with the addition or removal of content, causing the scroll bar 180 to change size according to the size of the viewing region with respect to the underlying content. In other implementations, a scroll bar can disappear (e.g., when the size of the viewing region is the same as the underlying content).

Figure 2:
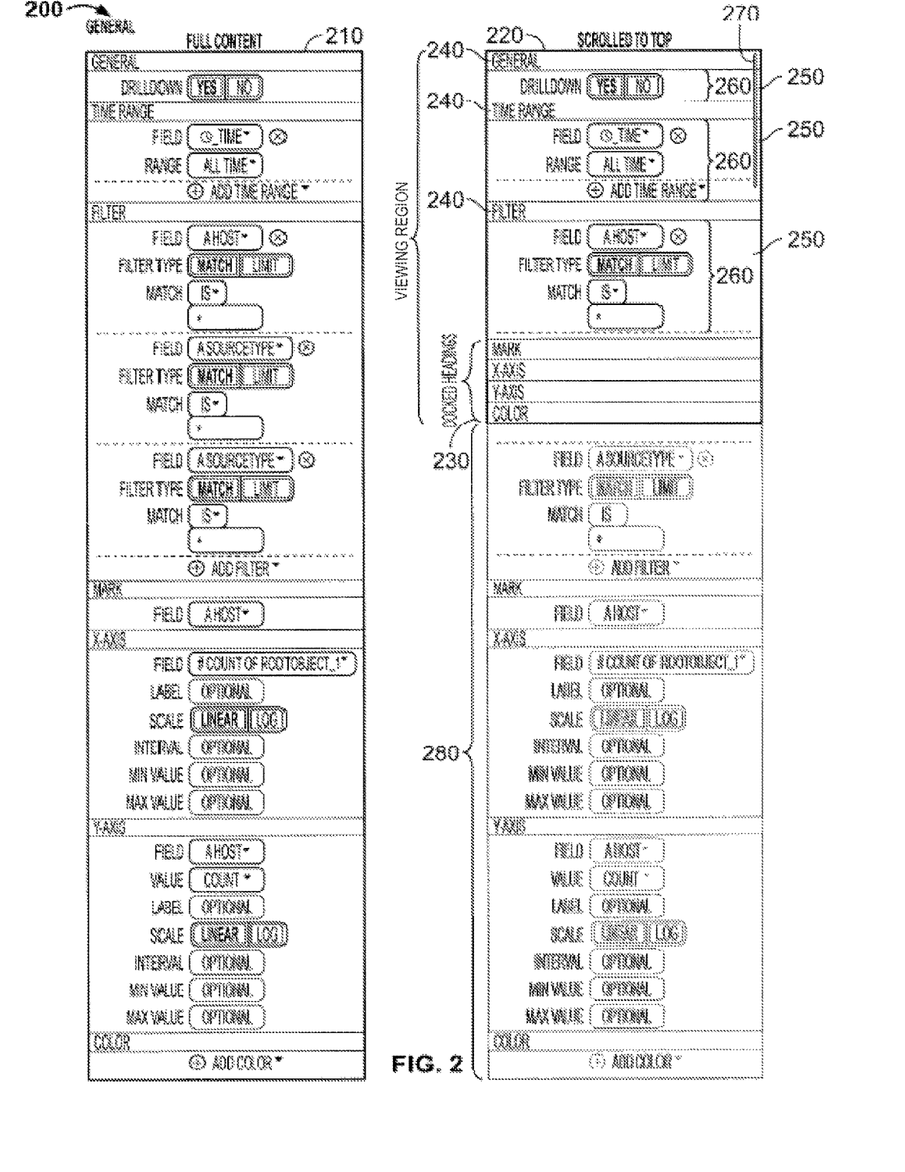
FIG. 2 shows an example display of a viewing region displaying underlying content and a viewing region that is smaller than the underlying content.

FIG. 2 shows an example display 200 of a viewing region 210 displaying underlying content and a viewing region 220 that is smaller than the underlying content. In this example display, viewing region 210 is the same size as the underlying content. Thus, all the underlying content is visible. Example display 200 also includes viewing region 220. In this example display, viewing region 220 is smaller than the underlying content that includes a combination of docked headings 230 (corresponding to non-visible content 280), undocked headings 240 (corresponding to visible content 250), and graphical elements 260.

Additionally, viewing region 220 includes scroll bar 270 that can be used to scroll through the visible content within viewing region 220. In this example, the headings labeled "general", "time range", and "filter" have been scrolled into view, and thus those headings are undocked and the viewing areas corresponding to those headings are visible. Additionally, the headings labeled "mark", "x-axis", "y-axis", and color have not been scrolled into view, and thus the headings are docked and the viewing areas corresponding to those headings are not visible.

Scroll bar 270 is at the top of viewing region 220, thus the portion of viewing region 220 that is visible is at the top. In this example, moving scroll bar 270 down will also change the portion of viewing region 220 that is visible. Additionally, in this example the headings that are undocked are at the top of viewing region 220, and the headings that are docked are at the bottom of viewing region 220.

Figure 3:
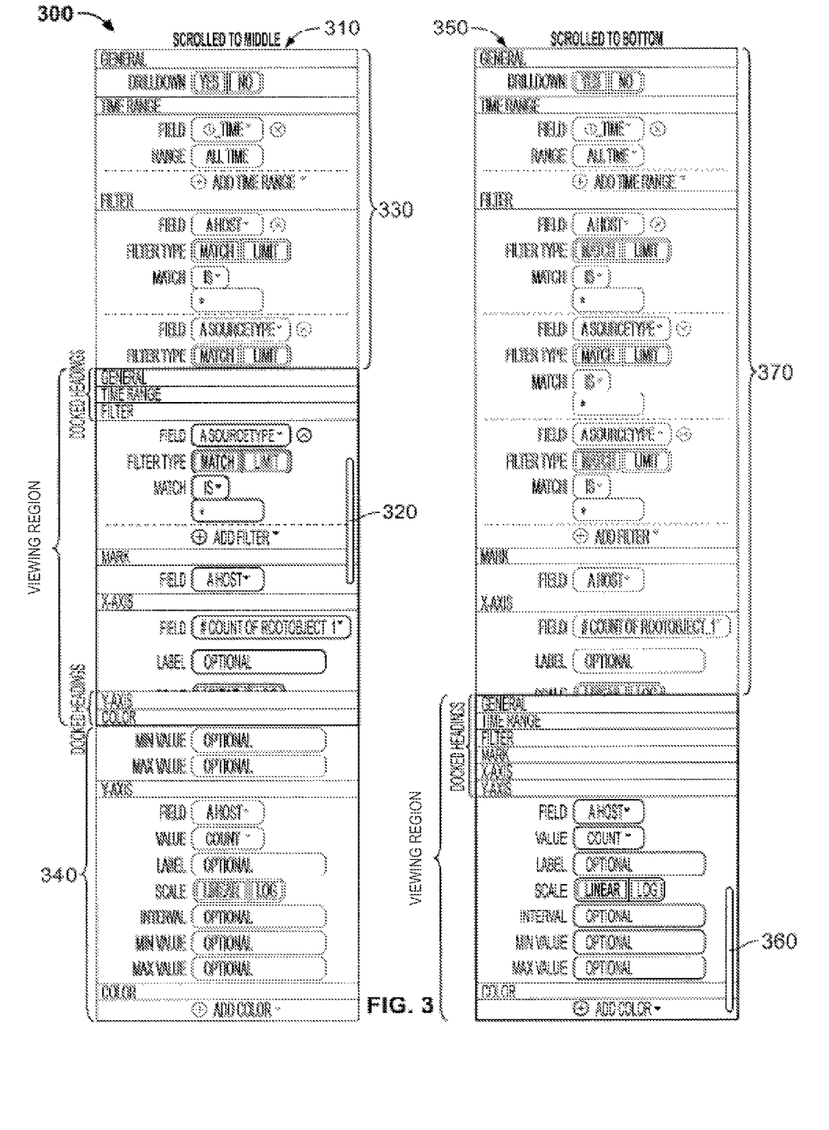
FIG. 3 shows additional example displays of viewing regions that are smaller than the underlying content.

FIG. 3 shows additional example display 300 of viewing regions 310 and 350 that are smaller than the underlying content. Viewing region 310 includes a combination of docked headings (corresponding to non-visible content), and undocked headings (corresponding to visible content). Viewing region 310 also includes a scroll bar 320 which is scrolled in this example to the middle of viewing region 310. Additionally, in this example, the headings "general" and "time range" are docked, and thus the viewing areas corresponding to those headings are not visible (as represented by shaded area 330 above those headings). The headings "filter", "mark", and "x-axis" have been undocked (e.g., scrolled over), and thus the viewing areas corresponding to those headings are visible. Finally, the headings "y-axis", and "color" remain docked, thus the viewing areas corresponding to those headings remain non-visible.

Example display 300 also includes viewing region 350. Viewing region 350 includes a combination of docked headings (corresponding to non-visible underlying content), and undocked headings (corresponding to visible underlying content). In this example, headings "general", "time range", "filter", "mark", and "x-axis" are docked, and thus the viewing areas corresponding to those headings are not visible. Additionally, headings "y-axis" and "color" are docked, and thus the viewing areas corresponding to those headings is visible.

In this example, scroll bar 360 is at the bottom of viewing region 350, thus the portion of viewing region 350 that is visible is at the bottom. Moving scroll bar 360 up can change the portion of viewing region 350 that is visible. Shaded area 370 represents the non-visible content corresponding to the docked (e.g., stacked) headings "general", "time range", "filter", "mark", and "x-axis". In this example, the shaded areas 330 and 340 represent the non-visible underlying content of the viewing areas corresponding to the docked headings. Because the underlying content remains constant and the display of the underlying content changes as the viewing region is scrolled, the amount of shaded area representing non-visble content, remain constant. Thus, the combined size of shaded areas 330 and 340 is equal in size to individual shaded areas 280 and 370.

Figure 4:
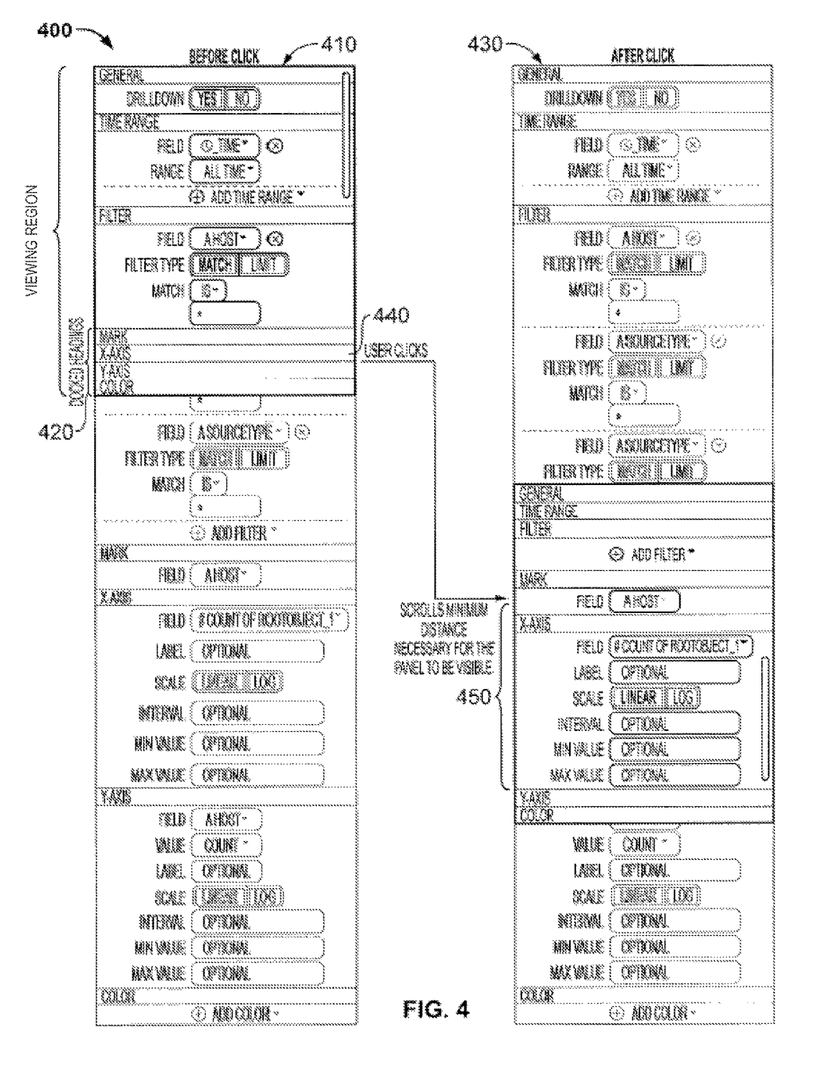
FIG. 4 shows an example display of an interaction with a viewing region.

As noted above, headings in a viewing region can be docked and stacked within any portion of the viewing region (e.g., the top or the bottom). FIG. 4 shows an example display 400 of an interaction with a viewing region 410. In this example, docked headings 420 are stacked at the bottom of viewing region 410. Selection of a bottom docked heading can cause the bottom of the stack of docked headings 420 to become visible within the viewing region from top down (e.g., downwardly) such that the viewing area corresponding to the selected heading (e.g., "x-axis" 440), is visible 450 beneath the heading and downward with respect to the stack (e.g., as shown on viewing region 430).

Figure 5:
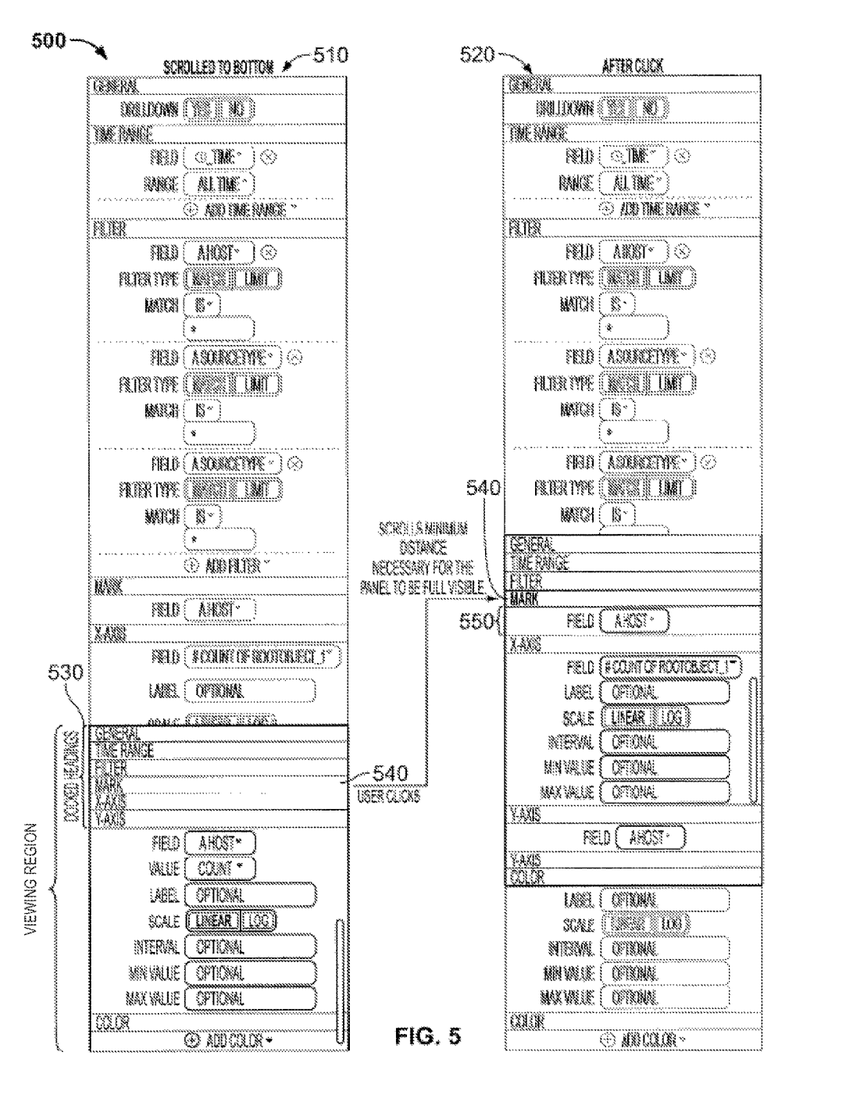
FIG. 5 shows another example display of an interaction with a viewing region.

FIG. 5 shows another example display 500 of an interaction with an viewing region 510. In this example, docked headings 530 are stacked at the top of viewing region 510. Selection of a top docked heading can cause the top of the stack of docked headings 530 to become visible within the viewing region from bottom up (e.g., upwardly) such that the viewing area corresponding to the selected heading (e.g., "mark" 540), is visible 550 beneath the heading and upward with respect to the stack (e.g., as shown on viewing region 520).

In these examples in FIGS. 4 and 5, the scroll movement and the viewing region can be automatically adjusted (e.g., downwardly or upwardly) according to the selected heading. As docked headings are selected, corresponding viewing areas within a viewing region can become visible. Additionally, the scroll bar associated with the viewing region and the visible portion of the underlying content can be adjusted. Thus, when a heading is selected, the scroll bar can scroll a minimum distance necessary to display the viewing area associated with the selected heading. When a scroll bar scrolls in either direction, the viewing region can adjust or move accordingly with respect to the underlying content. As the viewing region is adjusted, headings within the viewing region can dock and undock, and viewing areas corresponding to the headings can become visible (when the heading is undocked), and non-visible (when the heading is docked).

Figure 6:
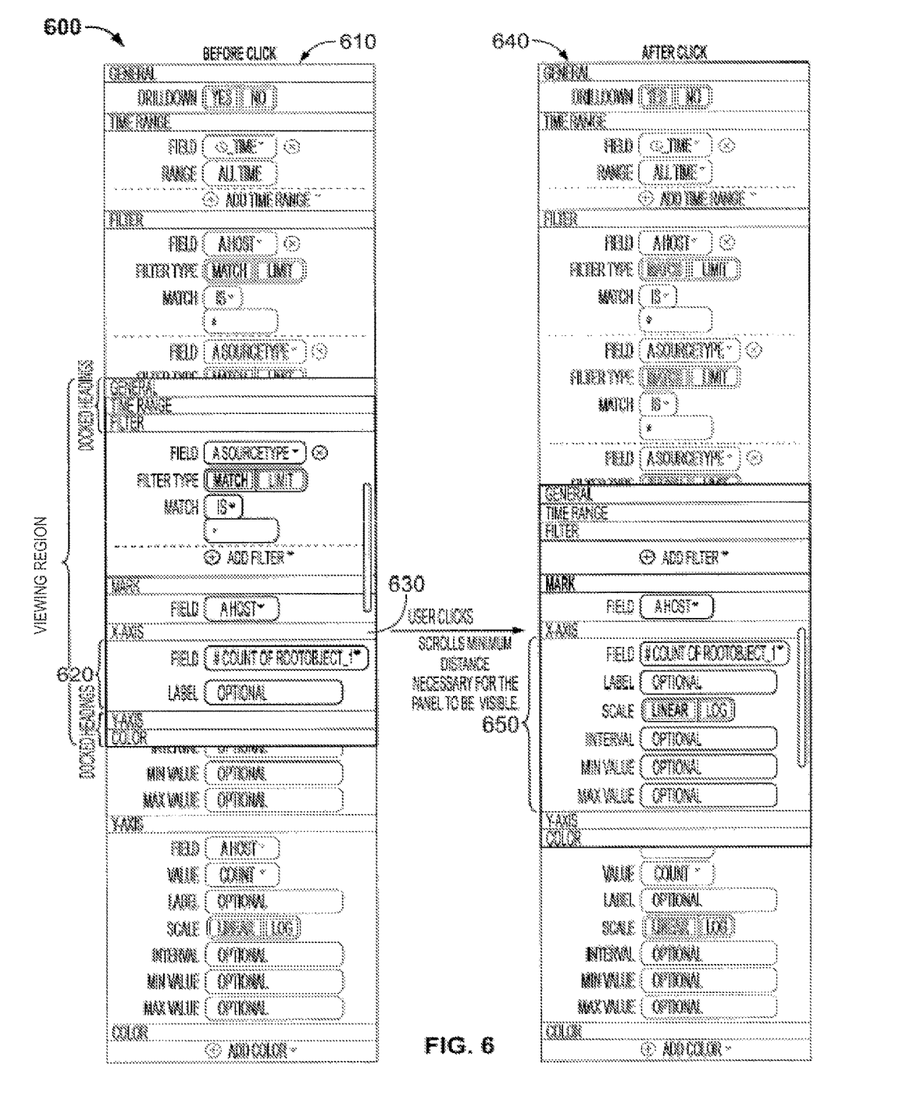
FIG. 6 shows an example display of an interaction with a partially hidden viewing area on an viewing region.

FIG. 6 shows an example display 600 of an interaction with a partially hidden (e.g., partially visible) viewing area 620 on an viewing region 610. In some implementations, a viewing area is partially visible. For example, a viewing area can be partially visible when the underlying content is taller or larger than the viewing region (less the heights of the docked headings). Selection of a heading corresponding to a partially hidden viewing area (e.g., "x-axis" 630), can cause the remainder of the viewing area to become visible 650 (as shown in viewing region 640). Additionally, the scroll bar associated with the viewing region and the visible portion of the underlying content can be adjusted. Thus, when a heading is selected, the scroll bar can scroll a minimum distance necessary to display the viewing area associated with the selected heading.

Figure 7:
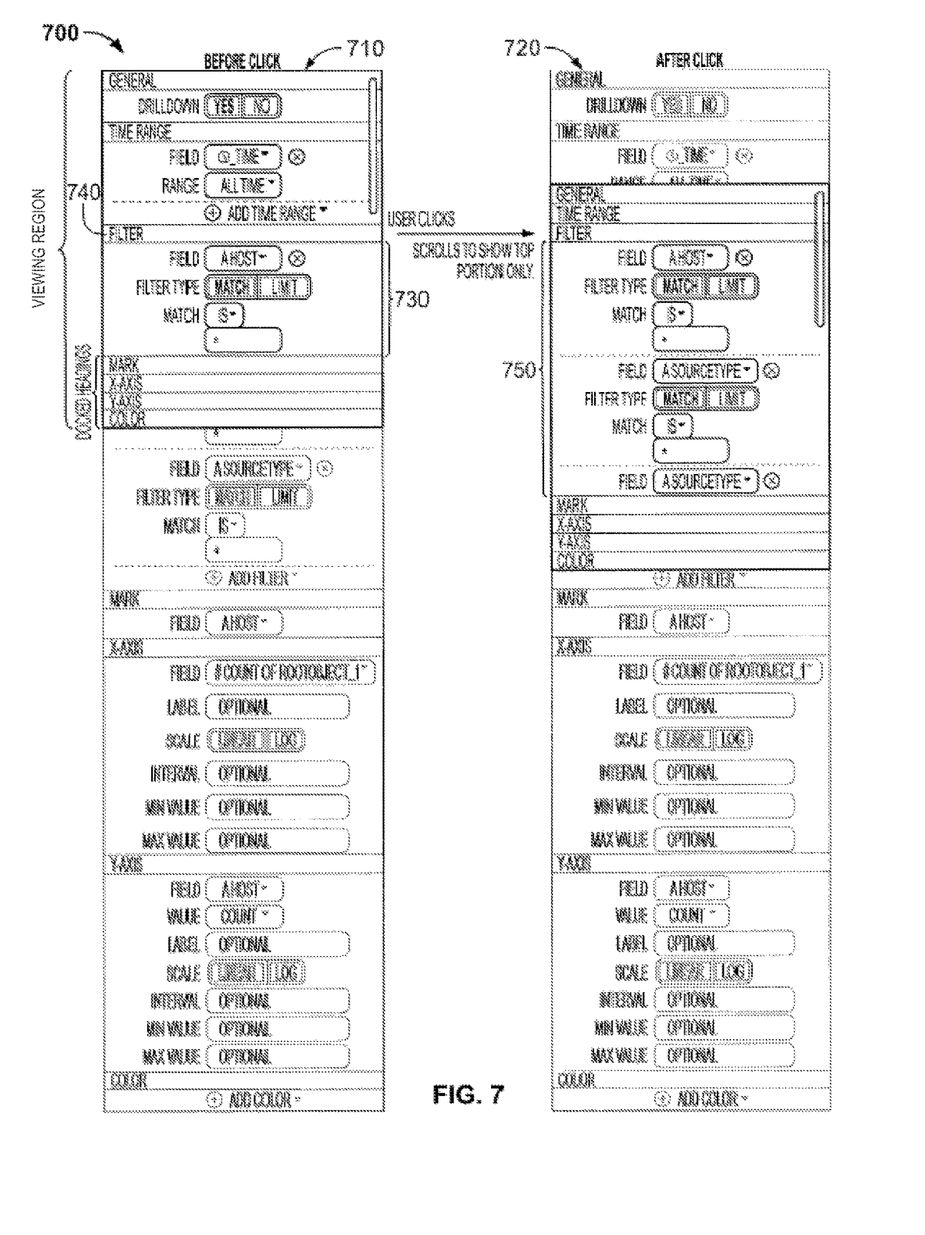
FIG. 7 shows another example display of an interaction with a partially hidden viewing area in a viewing region.

FIG. 7 shows another example display 700 of an interaction with a partially hidden viewing area 730 on an viewing region 710. In this example, viewing area 730 is larger than the available space between headings, thus the entire viewing area 730 is not fully (e.g., partially) visible. Selection of the heading corresponding to the partially hidden viewing area (e.g., "filter" 740) can cause more of the viewing area to become visible 750 (as shown in viewing region 720). Additionally, the scroll bar associated with the viewing region and the visible portion of the underlying content can be adjusted. In this example, when the heading is selected, the scroll bar can scroll to the top portion of the viewing area. Thus, more of the viewing area corresponding to the selected heading is visible and scrollable. To accommodate the additional viewing area, other headings can become docked and the viewing areas corresponding to other headings can be made non-visible (e.g., viewing areas corresponding to the "general" and "time range" headings can become non-visible).

Figure 8A:
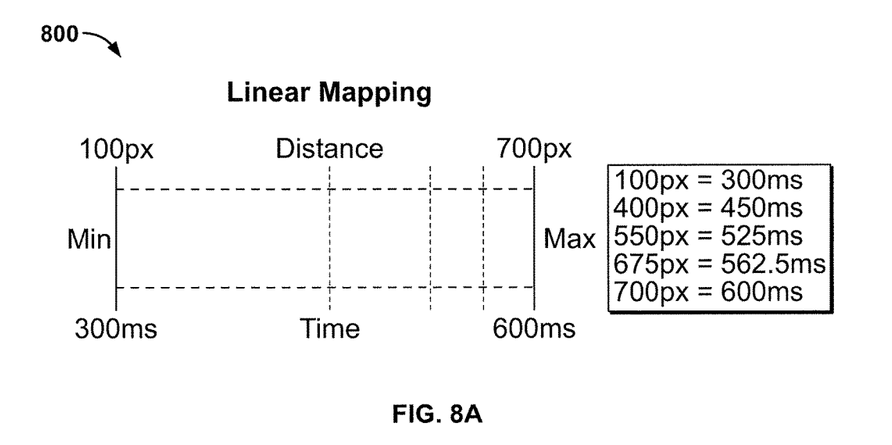
FIG. 8A shows an example linear maping.

As noted above, expanding and contracting viewing areas (and the associated animated effects), can occur at different rates depending on time and distance. FIG. 8A shows an example linear maping 800. In some implementations, the size of the entire viewing region can be measured in pixels (px). Distance can be measured using any unit (e.g., em, inch, etc.). Additionally, the amount of time it takes to expand or contract a viewing area can be measured in milliseconds (ms). Time can be measured using any measure of time (e.g., seconds, etc.). Using a linear mapping, a range of pixels can be selected, and an amount of time in ms can be selected. A measurement of a viewing area can be taken, and a total amount of time to adjust the viewing region can be determined. Using this information, a linear mapping can be generated.

For example, using linear mapping 800, a range of pixels (e.g., 100 px to 700 px pixels) has been selected. An amount of time (e.g., 300 ms to 600 ms), time has been selected. Evenly dividing the amount of time allows a mapping to be generated. In this example, 400 px is the center of the px scale, and 450 ms is the center of the time scale. Thus, using this linear mapping, it would take 450 ms to adjust the viewing region for a viewing area of 400 px. Additionally, in this example, a continued linear division would show that it would take 525 ms to adjust the viewing region for a viewing area of 550 px.

Figure 8B:
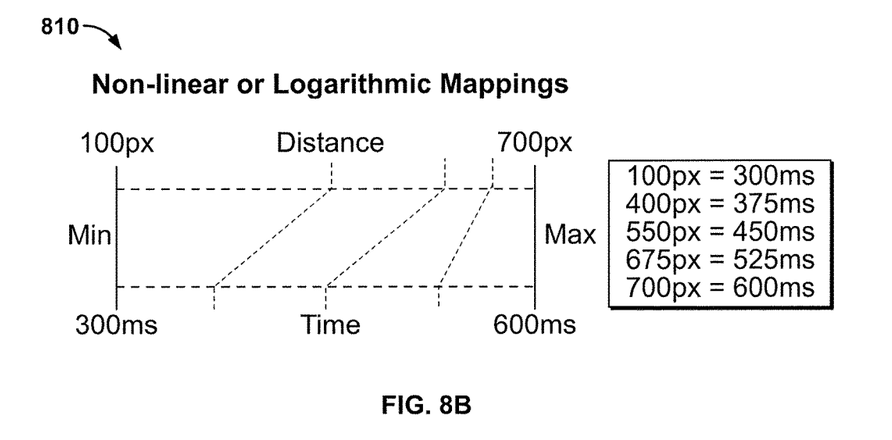
FIG. 8B shows an example non-linear mapping.

FIG. 8B shows an example non-linear mapping 810. Using a non-linear mapping, a range of pixels (px) can be defined, and an amount of time in milliseconds (ms) can be defined. A measurement of a viewing area can be taken, and a total amount of time to adjust the viewing region can be determined. Using this information, a non-linear mapping can be generated by assigning a distance (in px) to a time (in ms) and then evenly mapping from the assigned points.

For example, using non-linear mapping 810, a range of pixels (e.g., 100 px to 700 px pixels) has been selected. An amount of time (e.g., 300 ms to 600 ms), time has been selected. Additionally, distance 400 px has been assigned to time 375 ms. Thus, using this non-linear mapping, it would take 450 ms to adjust the viewing region for a viewing area of 375 px. Additionally, in this example, a continued division (e.g., an even division based on the assigned px/ms for the mapping), would show that it would take 450 ms to adjust the viewing region for a viewing area of 550 px. In some implementations, mappings can vary based on type of device or pre-determined preferences.

Evenly dividing the amount of time allows a mapping to be generated. In this example, 400 px is the center of the px scale, and 450 ms is the center of the time scale. Thus, using this linear mapping, it would take 450 ms to adjust the viewing region for a viewing area of 400 px. Additionally, in this example, a continued linear division would show that it would take 525 ms to adjust the viewing region for a viewing area of 550 px.

In some implementations, adjusting viewing areas can occur (e.g., begin, end, or begin and end), with an animated effect. Animated effects can include a slow break (e.g., a de-acceleration), an acceleration, a constant rate (e.g., an even expansion), or a bounce or other animated effect indicative of a completion of an expansion or contraction of a viewing area.

Figure 9:
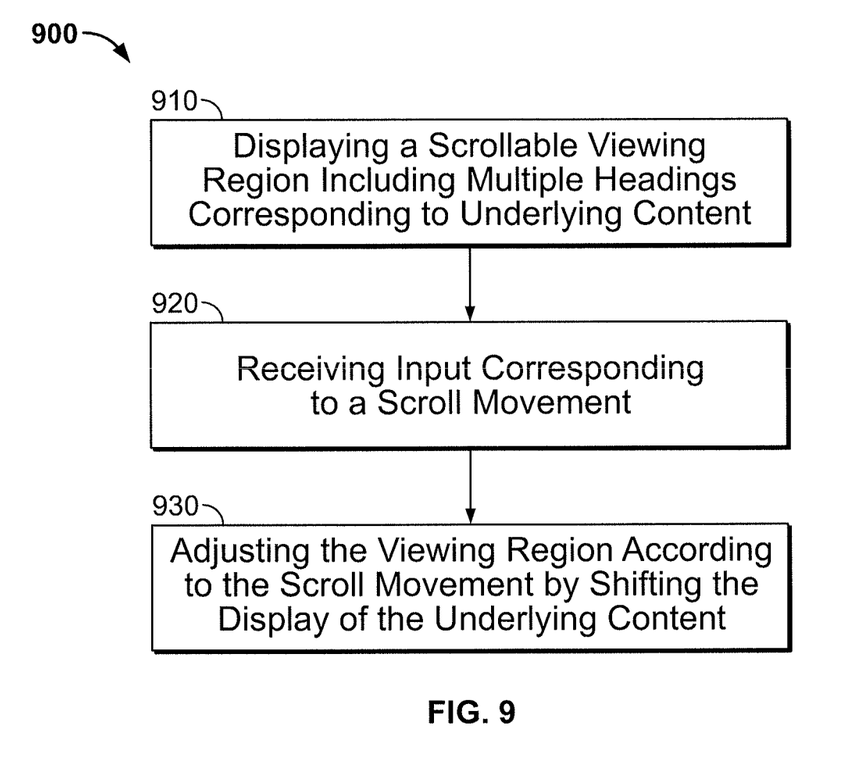
FIG. 9 shows an example flow chart for interacting with a viewing region.

FIG. 9 shows an example flow chart 900 for interacting with an viewing region. Interacting with an viewing region can begin when an viewing region is generated and displayed 910 by the system. The viewing region can be scrollable and the viewing region can be a fixed size. The viewing region can facilitate displaying underlying content divided into multiple sectioned viewing areas, and each sectioned viewing area can have a corresponding heading. Additionally, the headings can be docked or undocked.

Once the viewing region is displayed, input corresponding to a scroll movement can be received 920. The viewing region can then be adjusted 930 according to the scroll movement. Adjusting a viewing region can include shifting the display of the underlying content by docking or undocking one or more headings as they occur in the underlying content.

Figure 10:
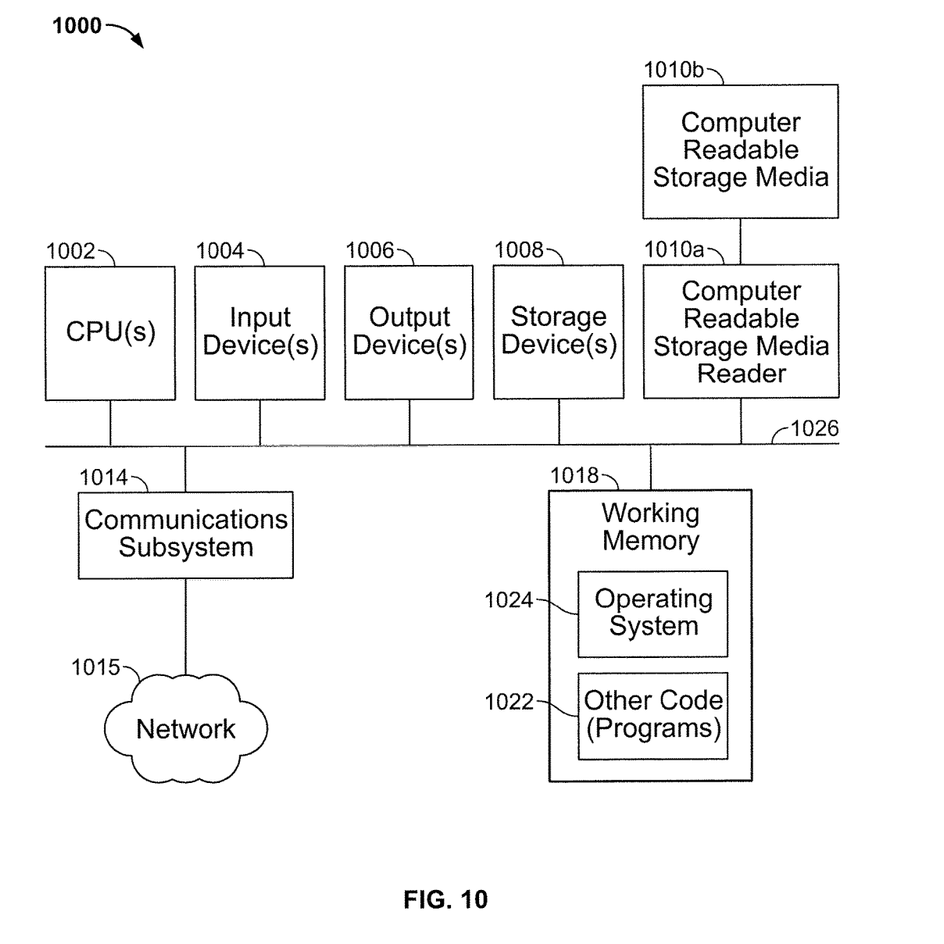
FIG. 10 shows a block diagram of an example system.

FIG. 10 provides a block diagram of a computer system 1000 for implementing functions and operations as described herein. The computer system 1000 may implement, for example, the viewing region within a graphical interface, as illustrated in FIG. 1. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The system 1000 is shown comprising hardware elements that can be electrically coupled via a system bus 1026 (or may otherwise be in communication, as appropriate). The hardware elements can include one or more central processor units (CPUs) 1002, including without limitation one or more general-purpose processors and/or one or more special-purpose processors (such as communication processing chips, graphics acceleration chips, and/or the like); one or more input devices 1004, that can include, without limitation, a mouse, a keyboard, and/or the like; and one or more output devices 1006, which can include without limitation a display device, a printer, audio device, and/or the like.

The computer system 1000 may further include (and/or be in communication with) one or more storage devices 1008, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computer system 1000 might also include a communications subsystem 1014, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 1014 may permit data to be exchanged with a network 1015, and/or any other devices described herein. The network 1015 may comprise a local area network (LAN) or a network such as the Internet, or a combination. In many embodiments, the computer system 1000 will further include a working memory 1018, which can include a RAM or ROM device, as described above.

The computational system 1000 also may comprise software elements, shown as being currently located within the working memory 1018, including an operating system 1024 and/or other program code, such as one or more application programs 1022, which may comprise computer programs performing tasks and operations described above, and/or may be designed to implement methods in accordance with the disclosed subject matter and/or systems in accordance with the disclosed subject matter, as described herein. Merely by way of example, one or more procedures described with respect to the method(s) discussed above might be implemented as code and/or instructions executable by a computer (and/or a processor within a computer). In one embodiment, the data generating and presenting operations are implemented as application programs 1022. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 1010b. In some embodiments, the computer readable storage medium 1010b may comprise the storage device(s) 1008 described above. In other embodiments, the computer readable storage medium 1010b might be incorporated within the computer system. In still other embodiments, the computer readable storage medium 1010b might be separate from the computer system (i.e., it may be a removable readable medium, such as a compact disc, etc.), and or might be provided in an installation package, such that the storage medium can be used to program a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code. In these embodiments, the computer readable storage medium 1010b may be read by a computer readable storage media reader 1010a.

It will be apparent that variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one embodiment, local and remote computer systems (such as the computer system 1000) are utilized to perform methods of the disclosed subject matter. According to a set of embodiments, some or all of the procedures of such methods are performed by the computer system 1000 in response to the processor 1002 executing one or more sequences of one or more instructions (which might be incorporated into the operating system 1024 and/or other code, such as an application program 1022) contained in the working memory 1018. Such instructions may be read into the working memory 1018 from another machine-readable medium, such as one or more of the storage device(s) 1008 (or 1010). Merely by way of example, execution of the sequences of instructions contained in the working memory 1018 might cause the processor(s) 1002 to perform one or more procedures of the methods described herein.

The terms "machine readable medium" and "computer readable medium," as used herein, refer to any medium that participates in providing data that causes a machine to operate in a specific fashion. In an embodiment implemented using the computer system 1000, various machine-readable media might be involved in providing instructions/code to processor(s) 1002 for execution and/or might be used to store and/or carry such instructions/code (e.g., as data transmissions or data communications). In many implementations, a computer readable medium is a physical and/or tangible storage medium. Such a medium may take many forms, including but not limited to, volatile and non-volatile media. Non-volatile computer-readable media includes, for example, optical or magnetic disks, such as the storage device(s) (1008 or 1010). Volatile computer-readable media includes, without limitation, dynamic memory, such as the working memory 1018. In some implementation, data may be carried over transmission media. Transmission media includes coaxial cables, copper wire, and fiber optics, including the wires that comprise the bus 1026, as well as the various components of the communication subsystem 1014 (and/or the media by which the communications subsystem 1014 provides communication with other devices). Hence, transmission media can also take the form of waves (including, without limitation, radio, acoustic, and/or light waves, such as those generated during radio-wave and infra-red data communications).

Common forms of physical and/or tangible non-volatile computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, or any other medium from which a computer can read instructions and/or code.

Various forms of machine-readable media may be involved in carrying one or more sequences of one or more instructions to the processor(s) 1002 for execution. Merely by way of example, the instructions may initially be carried on a magnetic disk and/or optical disc of a remote computer. A remote computer might load the instructions into its dynamic memory and send the instructions communications over a transmission medium to be received and/or executed by the computer system 1000. These communications, which might be in the form of electromagnetic communications, acoustic communications, optical communications, and/or the like, are all examples of carrier waves on which instructions can be encoded, in accordance with various embodiments of the disclosed subject matter.

The communications subsystem 1014 (and/or components thereof) generally will receive the communications, and the bus 1026 then might carry the communications (and/or the data, instructions, etc. carried by the communications) to the working memory 1018, from which the processor(s) 1002 retrieves and executes the instructions. The instructions received by the working memory 1018 may optionally be stored on a storage device 708 either before or after execution by the processor(s) 1002.

It will be appreciated that many processing capabilities in addition to those described are possible, without departing from the teachings according to the disclosed subject matter. Further, it should be noted that the methods, systems, and devices discussed above are intended merely to be examples. Various embodiments may omit, substitute, or add various procedures or components as appropriate. For example, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the disclosed subject matter.

Specific details are given in the description to provide a thorough understanding of the embodiments. However, it will be understood by one of ordinary skill in the art that the embodiments may be practiced without these specific details.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figures.

Other variations are within the spirit of the present disclosed subject matter. Thus, while the disclosed subject matter is susceptible to various modifications and alternative constructions, certain illustrated embodiments thereof are shown in the drawings and have been described above in detail. It should be understood, however, that there is no intention to limit the disclosed subject matter to the specific form or forms disclosed, but on the contrary, the intention is to cover all modifications, alternative constructions, and equivalents falling within the spirit and scope of the disclosed subject matter, as defined in the appended claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A computer-implemented method, comprising:
    displaying, on a computing device, a view panel having a first end and an opposing second end, the view panel displaying scrollable sections, wherein
        each scrollable section includes a heading bar and exposable content, wherein the exposable content of a scrollable section, when visible, is situated between the heading bar and the second end,
        when a particular heading bar, which is any heading bar of the view panel, is docked on either the first end or the second end, no exposable content is visible between the particular heading bar and the end on which the particular heading bar is docked, and
        the particular heading bar cannot scroll past a given end of the view panel without first becoming docked in a stack at the given end of the view panel;
    receiving input corresponding to scrolling the particular heading bar that is docked, the particular heading bar being associated with a particular scrollable section;
    when the particular heading bar is docked against the second end and the input corresponds to scrolling the particular heading bar toward the first end, scrolling the particular heading bar toward the first end while (a) exposing first exposable content of the particular scrollable section, and (b) collapsing other exposable content of another scrollable section of the view panel to make room for the first exposable content; and
    receiving input corresponding to a selection of the particular heading bar associated with the particular scrollable section, the particular heading bar containing a particular heading and having associated therewith a partially-exposed area of the first exposable content other than the particular heading, and responsive to the selection input, fully exposing the first exposable content of the partially-exposed area.

2. The method of claim 1, further including:
when the particular heading bar that is docked against the first end and the input corresponds to scrolling toward the second end, scrolling the scrollable section toward the second end while (a) exposing second exposable content of an adjoining scrollable section whose heading is docked against the first end, and (b) collapsing other exposable content of another scrollable section to make room for the second exposable content.

3. The method of claim 1, further including responsive to receiving the input corresponding to scrolling the particular heading bar that is docked, applying a non-linear mapping to the speed at which the scrolling is displayed on the computing device.

4. The method of claim 1, further including responsive to receiving the input corresponding to scrolling the particular heading bar that is docked, applying a nonlinear mapping to the speed at which the scrolling is displayed on the computing device that is faster during an initial scrolling than during an end of the scrolling.

5. The method of claim 1, further including responsive to receiving the input corresponding to scrolling the particular heading bar that is docked, applying a logarithmic mapping to the speed at which the scrolling is displayed on the computing device.

6. A computer-implemented method, comprising:
displaying on a computing device a view panel having a first end and an opposing second end, wherein
the view panel displays scrollable sections,
the scrollable sections each include a heading bar and exposable content, the exposable content for a scrollable section appears between the heading bar and the second end when the exposable content is visible,
when a particular heading bar, which is any heading bar of the view panel, is docked on either the first end or the second end, no exposable content is visible between the particular heading bar and the end on which the particular heading bar is docked, and
the particular heading bar cannot scroll past a given end of the view panel without first becoming docked in a stack at the given end of the view panel;
receiving input corresponding to scrolling that causes the particular heading bar to change from being docked to being undocked;
responsive to the input, displaying an updated view panel, including
undocking and moving the particular heading bar away from the end on which the particular heading bar is docked,
making visible a first exposable content between the particular heading bar and an adjoining heading bar, and
at least partially collapsing a second exposable content on a side of the particular heading bar opposite the adjoining heading bar; and
receiving input corresponding to a selection of the heading bar associated with the particular scrollable section, the particular heading bar containing a particular heading and having associated therewith a partially-exposed area of the first exposable content other than the particular heading, and responsive to the selection input, fully exposing the first exposable content of the partially-exposed area.

7. The method of claim 6, wherein:
the first end is a top of the view panel;
the adjoining heading bar is docked on the top of the view panel;
the particular heading bar is below the adjoining heading bar; and
the first exposable content that becomes visible is associated with the adjoining heading bar.

8. The method of claim 6, wherein:
the first end is a top of the view panel;
the adjoining heading bar is docked on the top of the view panel;
the particular heading bar is below the adjoining heading bar; and
the input corresponds to a scroll movement that causes the particular heading bar to move away from the adjoining heading bar and to expose first exposable content associated with the adjoining heading bar.

9. The method of claim 6, wherein:
the first end is a top of the view panel;
the adjoining heading bar is docked on the top of the view panel;
the particular heading bar is below the adjoining heading bar; and
the input corresponds to selection of the adjoining heading bar and the input causes the particular heading bar to undock and exposes content associated with the adjoining heading bar.

10. The method of claim 6, wherein:
the first end is a top of the view panel;
the adjoining heading bar is docked on the top of the view panel;
the particular heading bar is below the adjoining heading bar; and
the input corresponds to selection of the adjoining heading bar and the input causes the particular heading bar to undock to a location that fully exposes content associated with the adjoining heading bar.

11. The method of claim 6, wherein:
the first end is a top of the view panel;
the adjoining heading bar is docked on the top of the view panel;
the particular heading bar is below the adjoining heading bar; and
the input corresponds to selection of the adjoining heading bar and the input causes the particular heading bar to undock and move downward a minimum distance needed to fully expose content associated with the adjoining heading bar.

12. The method of claim 6, wherein multiple heading bars are docked in a stack between the particular heading bar and the top of the view panel.

13. The method of claim 6, wherein multiple heading bars are docked in a stack between the particular heading bar and both a top and a bottom of the view panel.

14. The method of claim 6, wherein:
the second end is a bottom of the view panel;
the adjoining heading bar is docked against the bottom of the view panel;
the particular heading bar is above the adjoining heading bar; and
the first exposable content that becomes visible is associated with the particular heading bar.

15. The method of claim 6, wherein:
the second end is a bottom of the view panel;
the adjoining heading bar is docked on the bottom of the view panel;
the particular heading bar is above the adjoining heading bar; and
the input corresponds to a scroll movement that causes the particular heading bar to move away from the adjoining heading bar and to expose first exposable content associated with the particular heading bar.

16. The method of claim 6, wherein:
the second end is a bottom of the view panel;
the adjoining heading bar is docked on the bottom of the view panel;
the particular heading bar is above the adjoining heading bar; and
the input corresponds to selection of the particular heading bar and the input causes the particular heading bar to undock and exposes content associated with the particular heading bar.

17. A non-transitory computer program product storing program instructions that, when executed on a computer, cause actions comprising:
displaying, on a computing device, a view panel having a first end and an opposing second end, the view panel displaying scrollable sections, wherein
each scrollable section includes a heading bar and exposable content, wherein the exposable content of a scrollable section, when visible, is situated between the heading bar and the second end,
when a particular heading bar, which is any heading bar of the view panel, is docked on either the first end or the second end, no exposable content is visible between the particular heading bar and the end on which the particular heading bar is docked, and
the particular heading bar cannot scroll past a given end of the view panel without first becoming docked in a stack at the given end of the view panel;
receiving input corresponding to scrolling the particular heading bar that is docked, the particular heading bar being associated with a particular scrollable section;
when the particular heading bar is docked against the second end and the input corresponds to scrolling the particular heading bar toward the first end, scrolling the particular heading bar toward the first end while (a) exposing first exposable content of the particular scrollable section, and (b) collapsing other exposable content of another scrollable section of the view panel to make room for the first exposable content; and
receiving input corresponding to a selection of the particular heading bar associated with the particular scrollable section, the particular heading bar containing a particular heading and having associated therewith a partially-exposed area of the first exposable content other than the particular heading, and responsive to the selection input, fully exposing the first exposable content of the partially-exposed area.

18. The method of claim 17, further including:
when the particular heading bar that is docked against the first end and the input corresponds to scrolling toward the second end, scrolling the scrollable section toward the second end while (a) exposing second exposable content of an adjoining scrollable section whose heading is docked against the first end, and (b) collapsing other exposable content of another scrollable section to make room for the second exposable content.

19. A non-transitory computer program product storing program instructions that, when executed on a computer, cause actions comprising:
displaying on a computing device a view panel having a first end and an opposing second end, wherein
the view panel displays scrollable sections, the scrollable sections each include a heading bar and exposable content,
the exposable content for a scrollable section appears between the heading bar and the second end when the exposable content is visible,
when a particular heading bar, which is any heading bar of the vie panel, is docked on either the first end or the second end, no exposable content is visible between the particular heading bar and the end on which the particular heading bar is docked, and
the particular heading bar cannot scroll past a given end of the view panel without first becoming docked in a stack at the given end of the view panel;
receiving input corresponding to scrolling that causes the particular heading bar to change from being docked to being undocked;
responsive to the input, displaying an updated view panel, including
undocking and moving the particular heading bar away from the end on which the particular heading bar is docked,
making visible a first exposable content between the particular heading bar and an adjoining heading bar, and
at least partially collapsing a second exposable content on a side of the particular heading bar opposite the adjoining heading bar; and
receiving input corresponding to a selection of the particular heading bar associated with the particular scrollable section, the particular heading bar containing a particular heading and having associated therewith a partially-exposed area of the first exposable content other than the particular heading, and responsive to the selection input, fully exposing the first exposable content of the partially-exposed area.

20. The computer program product of claim 19, wherein:
the first end is a top of the view panel;
the adjoining heading bar is docked on the top of the view panel;
the particular heading bar is below the adjoining heading bar; and
the first exposable content that becomes visible is associated with the adjoining heading bar.

21. The computer program product of claim 19, wherein:
the first end is a top of the view panel;
the adjoining heading bar is docked on the top of the view panel;
the particular heading bar is below the adjoining heading bar; and
the input corresponds to a scroll movement that causes the particular heading bar to move away from the adjoining heading bar and to expose first exposable content associated with the adjoining heading bar.

22. The computer program product of claim 19, wherein:
the first end is a top of the view panel;
the adjoining heading bar is docked on the top of the view panel;
the particular heading bar is below the adjoining heading bar; and
the input corresponds to selection of the adjoining heading bar and the input causes the particular heading bar to undock and exposes content associated with the adjoining heading bar.

23. The computer program product of claim 19, wherein:
the first end is a top of the view panel;
the adjoining heading bar is docked on the top of the view panel;
the particular heading bar is below the adjoining heading bar; and the input corresponds to selection of the adjoining heading bar and the input causes the particular heading bar to undock to a location that fully exposes content associated with the adjoining heading bar.

24. The computer program product of claim 19, wherein:
the first end is a top of the view panel;
the adjoining heading bar is docked on the top of the view panel;
the particular heading bar is below the adjoining heading bar; and
the input corresponds to selection of the adjoining heading bar and the input causes the particular heading bar to undock and move downward a minimum distance needed to fully expose content associated with the adjoining heading bar.

25. The computer program product of claim 19, wherein multiple heading bars are docked in a stack between the particular heading bar and the top of the view panel.

26. The computer program product of claim 19, wherein multiple heading bars are docked in a stacks between the particular heading bar and both a top and a bottom of the view panel.

27. The computer program product of claim 19, wherein:
the second end is a bottom of the view panel;
the adjoining heading bar is docked against the bottom of the view panel;
the particular heading bar is above the adjoining heading bar; and
the first exposable content that becomes visible is associated with the particular heading bar.

28. The computer program product of claim 19, wherein:
the second end is a bottom of the view panel;
the adjoining heading bar is docked on the bottom of the view panel;
the particular heading bar is above the adjoining heading bar; and
the input corresponds to a scroll movement that causes the particular heading bar to move away from the adjoining heading bar and to expose first exposable content associated with the particular heading bar.

29. The computer program product of claim 19, wherein:
the second end is a bottom of the view panel;
the adjoining heading bar is docked on the bottom of the view panel;
the particular heading bar is above the adjoining heading bar; and
the input corresponds to selection of the particular heading bar and the input causes the particular heading bar to undock and exposes content associated with the particular heading bar.

30. A computer-implemented method, comprising:
displaying, on a computing device, a view panel having a first end and an opposing second end, the view panel displaying scrollable sections, wherein
each scrollable section includes a heading bar and exposable content, wherein the exposable content of a scrollable section, when visible, is situated between the heading bar and the second end, and
when a particular heading bar, which is any heading bar of the view panel, is docked on either the first end or the second end, no exposable content is visible between the particular heading bar and the end on which the particular heading bar is docked;
receiving input corresponding to scrolling a first particular heading bar that is docked, the particular heading bar being associated with a particular scrollable section of the view panel;
when the particular heading bar is docked against the second end and the input corresponds to scrolling the particular heading bar toward the first end, scrolling the particular heading bar toward the first end while (a) exposing particular exposable content of the particular scrollable section, and (b) collapsing other exposable content of another scrollable section of the view panel to make room for the particular exposable content;
responsive to receiving the input corresponding to scrolling the particular heading bar that is docked, applying a non-linear mapping to the speed at which the scrolling is displayed on the computing device; and
receiving input corresponding to a selection of the particular heading bar associated with the particular scrollable section, the particular heading bar containing a particular heading and having associated therewith a partially-exposed area of the particular exposable content other than the particular heading, and responsive to the selection input, fully exposing the particular exposable content of the partially-exposed area associated with the particular heading bar.

* * * * *